United States Patent

Loeffler et al.

[11] 3,910,587

[45] Oct. 7, 1975

[54] FACE SEAL STRUCTURE

[75] Inventors: Robert I. Loeffler, Norman; Lonnie C. Higginbottom, Midwest City, both of Okla.

[73] Assignee: University Engineers, Inc., Norman, Okla.

[22] Filed: Aug. 2, 1974

[21] Appl. No.: 494,321

[52] U.S. Cl. .................... 277/63; 277/70; 277/74
[51] Int. Cl.² ...................... F16J 15/34; F16J 15/44
[58] Field of Search .............. 277/62, 63, 27, 70–79

[56] References Cited
UNITED STATES PATENTS

| | | | |
|---|---|---|---|
| 2,297,518 | 9/1942 | Wegerdt | 9/6.5 |
| 3,028,163 | 4/1962 | Heinrich | 277/63 |
| 3,044,786 | 7/1962 | Chillson | 277/70 |
| 3,391,941 | 7/1968 | Donley | 277/63 |
| 3,520,229 | 7/1970 | Slimm et al. | 91/6.5 |
| 3,585,901 | 6/1971 | Moon Jr. et al. | 91/6.5 |
| 3,699,845 | 10/1972 | Field | 9/6.5 |
| 3,804,424 | 4/1974 | Gardner | 277/74 |
| 3,806,135 | 4/1974 | Wiese | 277/74 |
| 3,813,103 | 5/1974 | Wiese | 277/74 |
| 3,829,103 | 8/1974 | Sussman | 277/74 |

Primary Examiner—Robert I. Smith
Attorney, Agent, or Firm—Laney, Dougherty, Hessin & Fish

[57] ABSTRACT

A face seal structure for sealing around intermittently communicating ports formed through two parallel planar faces which move relative to each other due to the rotation of one of the faces about a rotational axis extending substantially normal to both faces. The seal structure includes a rigid seal plate between the faces and having parallel planar surfaces which are parallel to the faces. The seal plate is keyed to a first of the faces for rotation therewith, although it is movable toward the second of the faces, and has at least two openings through it which are aligned with a pair of ports through the face to which it is keyed, which openings are periodically alignable with at least two ports extending through the second face as the second face rotates. A first sealing element having a flat bearing surface sealingly engages the second face and is secured to one of the surfaces of the seal plate around the openings therethrough, so that registering openings in the sealing element are surrounded by the flat bearing surface. A second, fluid confining sealing element is positioned between, and sealingly engages the seal plate and the face to which the seal plate is keyed. The flat bearing surface of the first sealing element is relieved in one of several optional ways to minimize the maximum force, due to the pressure of fluids flowing through the ports and openings, acting to force the flat bearing surface against the second face.

15 Claims, 20 Drawing Figures

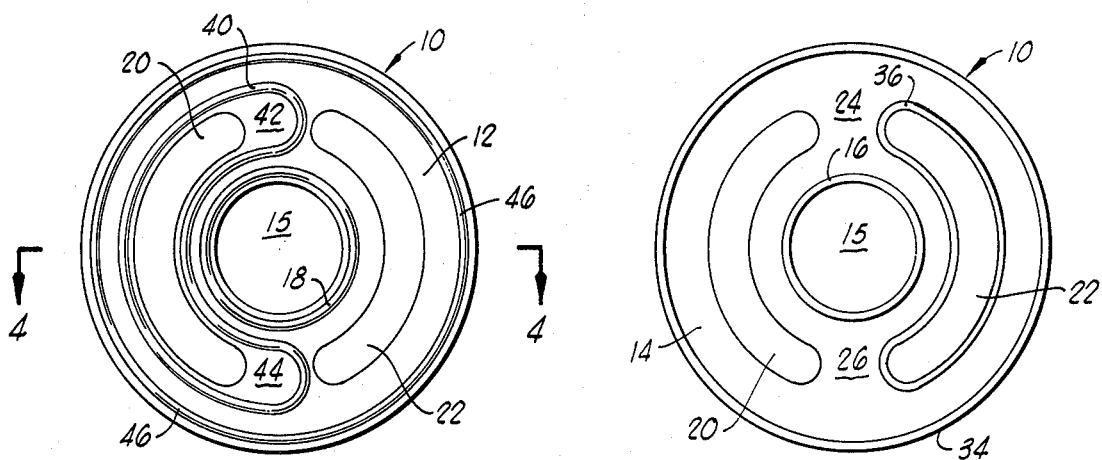
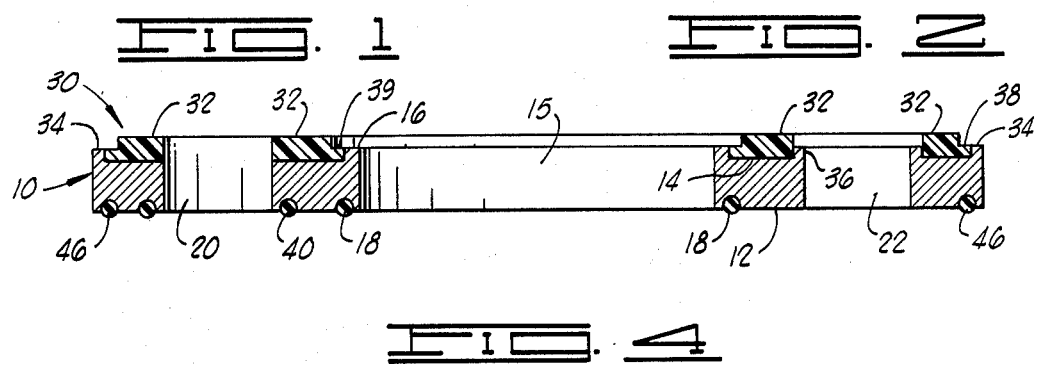
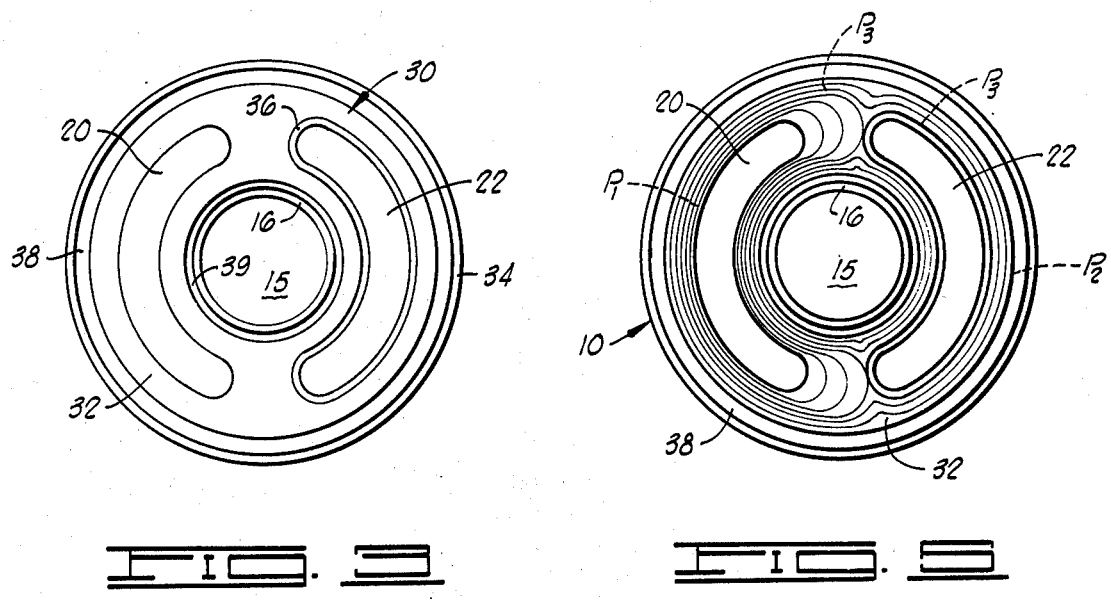

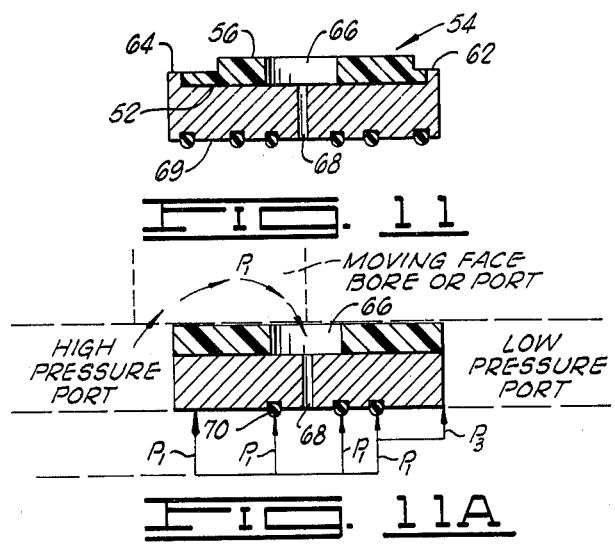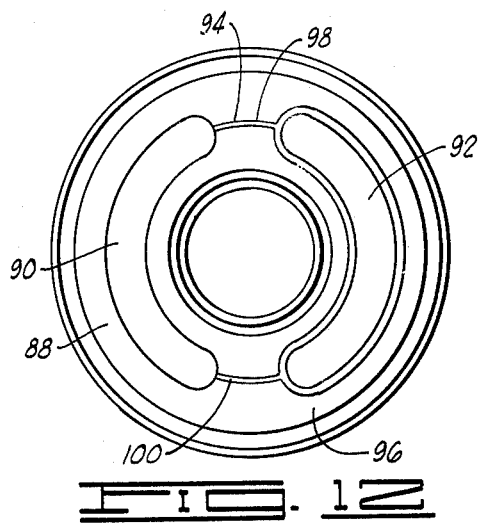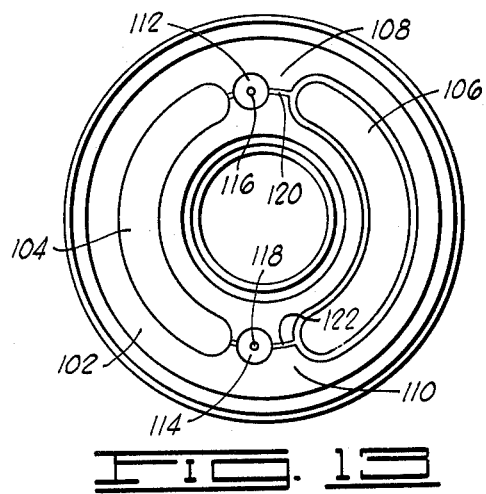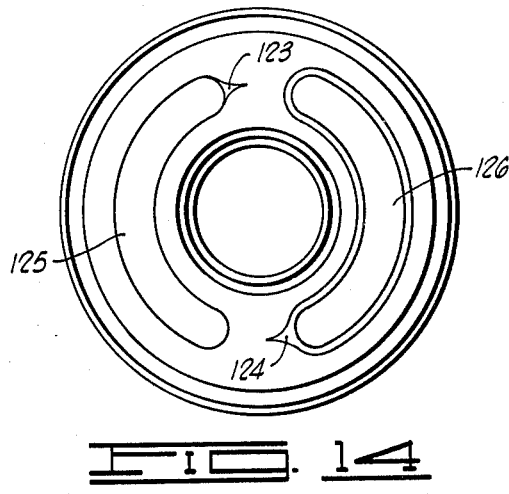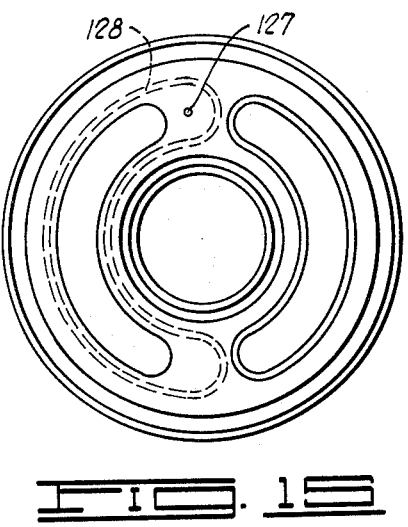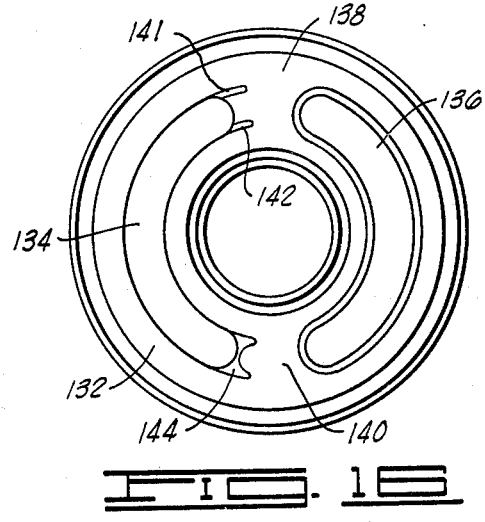

FACE SEAL STRUCTURE

RELATED APPLICATIONS

This application is directed to an improvement upon the related subject matter which appears in U.S. Pat. No. 3,582,090.

BACKGROUND OF THE INVENTION

1. Field of the Invention

This invention relates to seal structures, and more particularly, to face seals adapted to simultaneously sealingly engage two substantially parallel planar faces moving relative to each other about a common rotational axis extending normal to the parallel planar faces.

2. Brief Description of the Prior Art

There is general recognition in the field of seal technology that it is difficult to provide a seal which will effectively prevent the escape of a fluid from two communicating ports located, respectively, in two opposed, substantially parallel planar faces or surfaces which move relative to each other about a rotational axis extending normal to the planar surfaces or faces. The difficulty stems in large part from the fact that the relative movement of the faces with respect to each other subjects to a shearing force, any material functioning as a seal around and between the communicating ports. The seal material is moreover subjected to an abrupt change in the magnitude of the forces acting on the seal material as the ports in the two faces pass into and out of communication with each other.

A face seal designed to function between two relatively rotating planar surfaces is described in U.S. Pat. No. 3,124,079. Here, an effort is made to approach balancing of the disymmetrical loads imposed on the seal plate by adjusting those areas located on opposite sides of the seal plate which are acted on by fluid pressure at certain times so that minimal deforming or distorting force is exerted upon the seal plate during operation of the device in which it is located.

In U.S. Pat. No. 3,582,090, an improved face seal structure is depicted and described and comprises a rigid seal plate having a pair of opposed surfaces which are adapted to extend parallel to a pair of parallel, monoplanar faces, each having ports therein which are to be periodically communicated with each other through the openings in the seal plate. This communication is intermittent due to the movement of the faces relative to the other as at least one of the faces is rotated about an axis extending normal thereto, and positioned radially inwardly from the ports in the faces and the openings in the seal plate. The face seal is keyed to one of the faces for rotation therewith, but is free to move axially with respect to the axis of rotation, and normal to the two faces between which the face seal is positioned.

To prevent radial leakage of fluid between the faces, sealing elements are provided on opposite sides of the seal plate around the openings in the plate. One of these sealing elements is a high shear strength material which has a substantially monoplanar bearing surface which contacts the monoplanar face to which the seal plate is not keyed. This sealing element and the seal plate may be one integrally formed structure made of the same material. A second sealing element is located on the opposite side of the seal plate and is positioned between, and sealingly engages, the seal plate and the ported face to which the seal plate is keyed. The second sealing element is a structure which will confine against radial movement, a fluid passed through the ports in the faces and openings in the seal plate. The fluid is confined to an area defined within the second sealing element and correlated to the area of the bearing and sealing surface of the first described sealing element in a critical way as described in U.S. Pat. No. 3,582,090. Stated differently, the area of the monoplanar bearing and sealing surface of the first sealing element, and the area enclosed within the fluid confining second sealing element are geometrically and dimensionally related in a way such that a relatively small force due to liquid pressure exerted by a liquid or slurry passed through the openings in the seal plate (when the openings register with the ports in the opposed monoplanar faces) will always act upon that side of the seal plate opposite the monoplanar bearing and sealing surface, and will seat the face seal against the monoplanar face which moves relative thereto with minimal sealing force.

As explained in U.S. Pat. No. 3,582,090, a desiderata sought in the face seal construction there described is to maintain a relatively high integrity seal between the relatively moving monoplanar faces while minimizing, to the extent possible, the force acting to move the face seal into contact with the one of the monoplanar faces which moves relative thereto. It is further described and explained, however, that the fluid forces acting upon the face seal differ substantially in magnitude at such time during the use of the seal, and the relative movement between the two faces, as the ports in the moving face are out of registry or alignment with the openings through the face seal, as compared to the time during the cycle of rotation when such ports are aligned with the face seal openings. At the latter time during the cycle of rotation of the moving face, the force due to fluid pressure acting to move the face seal away from the rotating face is substantially less than such force acting at a time when the ports through the moving face are out of registry with the openings through the face seal and are, instead, aligned with what are referred to as the islands or solid portions of the face seal located between the openings therethrough. It is this force differential which exists during the two described times in the cycle of rotation which makes it necessary to have a higher degree of loading on the side of the face seal opposite the rotating face at the time of non-registration as described, than at the time of port-opening alignment. Such higher degree of loading is then necessary in order to be assured that loss of sealing contact between the face seal and the rotating monoplanar face will not occuur at any time during relative movement between the faces. In other words, by properly relating the areas defined by the monoplanar bearing and sealing surface of the first sealing element and the area confined within the second sealing element located on the opposite side of the face seal, the face seal structure described in U.S. Pat. No. 3,582,090 achieves a fluid pressure balancing of the face seal so that the minimum force is exerted against the face seal which is necessary to maintain the monoplanar sealing and bearing surface in sealing contact with the rotating face at all times during the rotational cycle. A substantially greater force does act, however, to force the face seal, and specifically the monoplanar bearing suface, into contact with the moving monoplanar face than is necessary to maintain sealing engagement at that time during which the openings through the face seal are in registry with the ports or bores in the moving monoplanar face. The result of this relatively large force acting to move the seal plate against the moving face at time is the requirement of a larger than desirable motive power input to the device which carries the moving face in order to rotate the moving face relative to the stationary face seal in contact therewith. Also, because of the greater loading forces, and their development in an uneven manner transversely across the face seal, the integrity and life of the seal is greatly diminished.

BRIEF DESCRIPTION OF THE PRESENT INVENTION

The present invention is an improved face seal adapted to seal between two ported, planar parallel faces as one of the faces rotates about an axis extending normal to both the faces. The face seal affords advantage in use in that it seals effectively while exerting a lesser resistance to rotation of the rotating face than face seals of the type illustrated and described in U.S. Pat. No. 3,124,079 and U.S. Pat. No. 3,582,090. Thus, less power is required to turn the rotor or other structure carrying the rotating face, and the face seal itself sustains less wear and stress, and is characterized in having an extended service life. The face seal is also improved in that it reduces the magnitude of the shock loading of the seal at a time when a fluid passes through the openings of the seal, after having been temporarily blocked by the body of the seal from passage through such openings.

Broadly described, the face seal of the invention comprises a rigid seal plate having parallel, monoplanar opposite sides adapted to extend parallel to the parallel faces between which the face seal is to be positioned and function. The seal plate has a plurality of spaced openings therethrough disposed a common radial distance outwardly from a central point in the face seal, with such openings separated by island portions of the seal plate.

On one monoplanar side of the seal plate, a monoplanar bearing and sealing surface is located and extends parallel to the parallel, monoplanar opposite sides of the seal plate. This bearing and sealing surface may be carried by a separate sealing element bonded to the seal plate, or it may be a part of the seal plate itself. The bearing and sealing surface surrounds the openings in the seal plate and itself has openings which register with the openings through the seal plate, and island portions which overlie the island portions of the seal plate. One or more reliefs are provided in at least one of the island portions of the bearing and sealing surface for the retention and/or conveyance of a fluid entering such relief during operation of the face seal.

At least one fluid retaining sealing element is secured to the opposite monoplanar side of the seal plate from the monoplanar bearing and sealing surface, and this sealing element extends around and encompasses an area on said opposite monoplanar side of the plate. This area encompassed within the fluid retaining sealing element is correlated to the area of the monoplanar bearing and sealing surface to maximize balancing or equilibration of fluid pressure forces acting across the seal plate in a direction normal thereto. Each of the fluid retaining sealing elements also encompasses or extends around one of the openings through the seal plate, and the encircled area includes a part of one or more of the islands between seal plate openings. The number of openings through the seal plate is always an even number of openings, and where a plurality of fluid retaining sealing elements are used, they are preferably located so as to encircle every other one of the openings through the seal plate. In some types of usage of the seal plate, each of the openings may be encircled by the described fluid retaining sealing elements.

In a preferred embodiment of the invention, at least one additional fluid retaining sealing element is secured to the opposite side of the seal plate from the monoplanar bearing and sealing surface, and each of these additional sealing elements is positioned within (is encircled by) one of the first mentioned fluid retaining sealing elements. Each additional fluid retaining sealing element is located on one of the island portions of the seal plate and encircles an area forming a part of such island portion. In this preferred embodiment of the invention, the reliefs in the monoplanar sealing and bearing surface are at least equal in number to the number of the described additional sealing elements, and a relief in the form of a recess is provided in correspondence to each of the additional fluid retaining sealing elements in alignment with the same island portion of the face seal which carries the corresponding additional fluid retaining sealing element. An aperture through the seal plate communicates the area within each additional fluid retaining sealing element with the corresponding recess area on the monoplanar sealing and bearing surface on the opposite side of the seal plate.

The face seal of the present invention differs from the face seal described in U.S. Pat. No. 3,582,090 by the inclusion of one or more relieved areas in the monoplanar bearing and sealing surface on one side of the seal plate. These relieved areas are positioned over the island portions of the face seal and, by their exposure to relatively high fluid pressure at certain critical times during the operation of the face seal, function to allow forces to be developed across the seal plate in one direction which more nearly balance opposing forces then acting in an opposite direction. The face seal, constructed in the manner described, is particularly useful in sealing between a pair of opposed, ported monoplanar faces, one of which faces contains at least one port connected to a source of relatively high pressure fluid, and at least one port connected to a source of relatively low pressure fluid, with the other of the faces rotating against the face seal to periodically communicate a plurality of ports therein, through the openings in the seal plate, with the high and low pressure ports in the first face. The face seal can be very usefully employed with energy exchange engines of the type described in U.S. Pat. No. 3,431,747.

An important object of the invention is to provide an improved face seal structure which can be utilized for sealing against the escape of high pressure fluid between two parallel, substantially monoplanar faces during the movement of one of these faces relative to the other, and as such fluid is being passed from a port in one of the faces into a port in the other face as such ports cyclically move into and out of registry with each other.

A more specific object of the invention is to provide a face seal structure which provides an effective fluid seal between two parallel, monoplanar faces while offering minimum resistance to the movement of one of the faces relative to the other.

Another object of the invention is to provide a face seal which is configured to more nearly achieve a balance of forces acting across the seal during operation of the seal in position between two ported, parallel, monoplanar faces.

Yet another object of the invention is to provide a face seal which can be relatively economically constructed, and which is not rapidly destroyed or weakened by the passage across the seal of a port or aperture formed in one of the two faces between which the seal is established.

Additional objects and advantages of the invention will become apparent as the following detailed description is read in conjunction with the accompanying drawings which illustrate the invention.

BRIEF DESCRIPTION OF THE DRAWINGS

FIG. 1 is a view in elevation of one side of a face seal constructed in accordance with the disclosure of U.S. Pat. No. 3,582,090, showing one side of the seal plate forming a part of the face seal, which side of the seal plate carries a plurality of fluid confining sealing members.

FIG. 2 is a view in elevation showing the appearance of the opposite side of the seal plate from that shown in FIG. 1, and illustrating the appearance of the seal plate when one of the sealing elements is removed.

FIG. 3 is a view in elevation of the seal plate showing the same side of the seal plate as that which is illustrated in FIG. 2 with a sealing element having a monoplanar bearing and sealing surface positioned on the seal plate.

FIG. 4 is a sectional view taken along line 4—4 of FIG. 1.

FIG. 5 is a diagrammatic illustration of the manner in which fluid pressure acts against the monoplanar bearing and sealing surface of a sealing element carried on one side of the seal plate, as such sealing element and seal plate are depicted in FIG. 3.

FIG. 11 is a sectional view taken along line 11—11 of FIG. 10.

FIG. 11A is a diagram illustrating the manner in which fluid pressures act on a portion of the face seal shown in FIGS. 9 and 10 at a time when the ports in faces between which the face seal is positioned are aligned with the ports through the face seal.

FIG. 12 is a view in elevation of the same side of a seal plate as that side which is depicted in FIG. 10, but illustrating a different embodiment of the present invention.

FIG. 13 is a side elevation view of one side of a seal plate constructed in accordance with the present invention, but illustrating yet another emobdiment of the invention, and depicting the configuration and location of certain reliefs provided in the monoplanar bearing and sealing surface forming a part of the face seal.

FIG. 14 is a view in elevation of one side of a face seal constructed in accordance with another embodiment of the present invention.

FIG. 15 is a side elevation view of a seal plate included in a face seal constructed in accordance with the present invention, and showing yet another type of relief formed in the monoplanar bearing and sealing surface located on one side of the seal plate.

FIG. 16 is a side elevation view of a seal plate included in a face seal constructed in accordance with yet another embodiment of the present invention, and illustrating the manner in which the monoplanar bearing and sealing surface is relieved in this embodiment of the invention.

DETAILED DESCRIPTION OF PREFERRED EMBODIMENTS OF THE INVENTION

Figure 6:
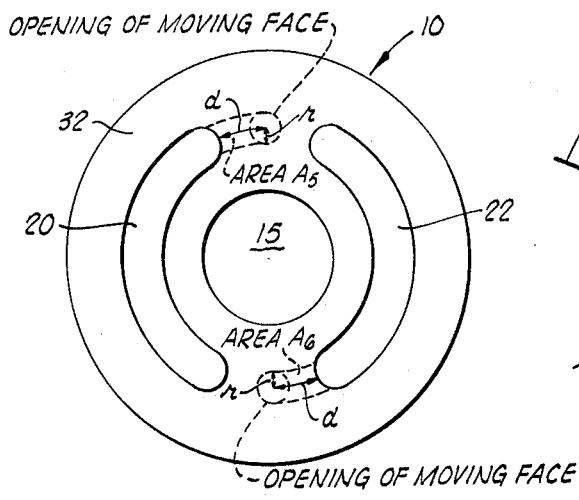
FIG. 6 is a diagrammatic illustration showing the areas of the seal plate against which certain pressures act during one operating status of the face seal described in U.S. Pat. No. 3,582,090.

Since the present invention constitutes an improvement with respect to the type of face seal structure illustrated and described in U.S. Pat. No. 3,582,090, and since the face seal structures of this invention incorporate and include some of the basic principles which yield the advantage attributed to the face seal structure depicted and described in the cited patent, it is believed that it will be very helpful to initially review and discuss some of those basic principles, concurrently making reference to certain selected views from the drawings of U.S. Pat. No. 3,582,090. Moreover, in order to be certain that the applicable principles which apply commonly to the face seal shown in the cited patent and to the present invention are understood as being important to an understanding of the present invention, and to the ability of those skilled in the art to utilize all the needed principles to employ the present invention, the drawings and specification of U.S. Pat. No. 3,582,090 are incorporated herein by reference.

Face seals of the general type under consideration and described in detail in U.S. Pat. No. 3,582,090 include a disc shaped seal plate 10 having a pair of opposed, substantially monoplanar surfaces 12 and 14 extending parallel to each other, and located on opposite sides of the seal plate (as depicted in FIGS. 1 and 2).

The seal plate 10 can be made of steel or other rigid material, and is provided, in one form, with a central opening 15 formed therethrough to accommodate a shaft, axle or similar structure encountered in certain usages of the face seal. In general, usages of this type will involve the positioning of the face seal between a pair of opposed, substantially monoplanar parallel faces, each having ports therethrough which are to be periodically communicated with openings or ports of a type hereinafter described formed through the seal plate 10. Further, this mode of usage contemplates that one of the monoplanar faces against which the face seal of the invention seals will be rotated relative to the other monoplanar face about a central axis which extends through the center of the opening 15. To facilitate this movement, the described axle or shaft may be provided on one of the bodies which carry the monoplanar faces, and such shaft is extended through the opening 15 so as to permit the face seal to rotate with one of the faces to which it is keyed relative to the other rotating face against which it seals. In order to position the face seal on such shaft or axle, and to provide a seal relative to fluid escaping past the face seal along such shaft, in one embodiment of the invention an annular rib or flange 16 is provided around the opening 15 on one side of the seal plate 10, and an annular O-ring 18 is positioned in a suitable retaining groove around the central opening and on the opposite side of the seal plate, as illustrated in FIGS. 1 and 2.

The seal plate 10 has a plurality of openings, apertures or ports formed therethrough, with such ports equidistantly spaced in a radial direction from the central opening 15. In the illustrated embodiment of the invention, a pair of banana or kidney shaped arcuate ports or openings are formed through the seal plate 10 and, for reasons which will hereinafter become apparent, will be referred to as a high pressure port 20 and a low pressure port 22. It will be perceived in referring to FIGS. 1 and 2 that the high pressure and low pressure ports 20 and 22, respectively, each extend slightly less than ½ way around the seal plate, and each lies on an imaginary circular line disposed concentrically with respect to the central opening 15 through the seal plate. The ports 20 and 22 are separated by island portions 24 and 26 of the seal plate 10.

In the use of face seals of the type described, the face seal is positioned between two monoplanar faces with the opposite sides 12 and 14 of the seal plate 10 extending parallel to the parallel monoplanar faces. Each of such monoplanar faces has a plurality of ports or bores formed therein and opening adjacent the face seal. The face seal is keyed or fixed to one of the faces so that it does not turn relative to this face in rotative movement about a rotational axis extended through the center of the central opening 15 and projected normal to this monoplanar face. The other of the monoplanar faces is free to rotate about such axis in relation to both the face seal and the monoplanar face to which the face seal is keyed.

In a preferred usage of the face seal of the invention, the monoplanar face to which the face seal is keyed has a source of high pressure fluid connected to one of its ports or bores, and this bore constantly registers or communicates with the high pressure port 20 in the face seal. Another of the bores through the face keyed to the face seal is connected to a source of relatively low pressure fluid (relatively low in relation to the high pressure fluid transmitted to the high pressure bore), and this low pressure bore registers and communicates with the low pressure port 22 of the face seal. The ports or bores formed through the moving face in contact with the face seal are located a radial distance from the axis of rotation of the moving face such that these bores are carried, during movement of the moving face, along the circular path upon which the high and low pressure ports 20 and 22, respectively, in the face seal are located, and therefore intermittently and alternately communicate with the high and low pressure ports in the face seal. There thus occurs during operation of such described systems incorporating the face seal of the present invention, intermittent communication of the ports or bores in the two faces, between which the face seal is located, through the high and low pressure ports 20 and 22 of the face seal, so that the bores in the rotating face alternately receive relatively high pressure fluid and relatively low pressure fluid from the two face seal ports 20 and 22. It will be further apparent that during the rotation of the moving face relative to the face seal, times occur during each rotational cycle in which the bores in the moving face are partially or totally occluded by their alignment with the island portions 24 and 26 of the seal plate 10, as contrasted with registry and alignment with the ports 20 or 22.

For a more detailed explanation of one specific application of the face seal of the present invention as it may be gainfully utilized in an energy exchange engine which includes a rotor carrying the movable face herein described, and a stationary structure carrying the other face to which the face seal is keyed, reference is again made to U.S. Pat. No. 3,582,090 which depicts such energy exchange engine with face seals of the general type here under discussion included therein, and illustrating the relationship of the bores or ports through the faces between which the face seal is located, and the openings or ports, both high pressure and low pressure, of the face seal. With respect to the relative positioning of the face seal in such energy exchange engine structures, the face seal of the present invention is substantially identically disposed, and broadly functions for the transmissions of high and low pressure fluids between the two monoplanar faces in the same way as the face seal described in U.S. Pat. No. 3,582,090.

The seal plate 10 of face seals of the general type under discussion can be provided with a first sealing element 30 disposed on one side thereof, and having the form of a disc shaped sheet of material preferably having a relatively low coefficient of friction and having good mechanical strength, and particularly, high shear strength. The first sealing element is configured to have a raised monoplanar bearing and sealing portion or surface 32 which extends around or surrounds the high pressure and low pressure 20 and 22. The surface 32 extends substantially parallel to the opposite sides of the seal plate 10, and therefore parallel with respect to the monoplanar faces between which the face seal is located and used. Alternatively, the first sealing element may be eliminated, and the bearing and sealing surface 32 simply built up on, and formed integrally with, the seal plate 10. This is a particularly desirable construction in seal plates made of tungsten carbide, and such material and construction constitute one of the most useful forms of the invention. The first sealing element 30 is shown positioned on the side 14 of the seal plate 10 and is bonded thereto by any suitable means (see FIGS. 3 and 4).

As shown in FIG. 4 of the drawings, the first sealing element 30 is further retained on the seal plate 10 by means of an annular flange 34 extending around the seal plate at the outer periphery thereof, a retainer flange 36 which projects upwardly around the defining perimeter of the low pressure port 22 in the seal plate and the annular flange 16. It will further be noted in referring to FIG. 4 that disposed radially outwardly and radially inwardly from the raised bearing and sealing surface 32 of the first sealing element 30, this sealing element has peripheral flange portions which carry outwardly facing surfaces 38 and 39. The surface 38 is located radially outwardly from the monoplanar bearing and sealing surface 32, and the surface 39 is located radially inwardly therefrom as shown in FIG. 3 of the drawings. The area of the bearing and sealing surface 32 is an important aspect of the present invention, as well as in face seals of this general type, and its significance will be hereinafter explained.

Positioned on the opposite side of the seal plate 10 from the side 14 which carries the first sealing element 30, a plurality of additional sealing elements are secured to the face seal. Thus, a fluid retaining second sealing element 40 which, in the illustrated embodiment, is an O-ring seal, is configured to extend around, and enclose, the high pressure port 20 through the seal plate 10. It will be further noted that the second sealing element 40, which is retained in a suitable groove formed in the side 12 of the seal plate, encompasses or encloses areas 42 and 44 at opposite ends of the high pressure port 20, and constituting a part of the island portions 24 and 26 which are located between the high and low pressure ports 20 and 22, respectively. Also mounted in a suitable annular groove formed in the side 12 of the seal plate 10 is an annular O-ring seal 46 which is positioned relatively close to the outer periphery of the seal plate 10. The O-ring seals 18, 40 and 46 are made of a suitable elastomeric material and function as fluid confining seals in a manner hereinafter described in greater detail. It is again pointed out that in some instances, particularly where the pressure of a fluid introduced to the low pressure port is not substantially lower than the pressure of a fluid introduced to the high pressure port, it may afford some advantage to place a second O-ring seal around the low pressure port 22 in a configuration similar to the configuration of the seal 40, and in such case, dispense with the seals 18 and 46.

The face seal, as it has thus far been described, and as illustrated in FIGS. 1–4, is a face seal constructed identically to that illustrated and described in U.S. Pat. No. 3,582,090. As further described in that patent, certain fluid pressures are exerted upon the face seal at certain times during the operation of a structure having a pair of monoplanar faces which are positioned is sealing relationship to the face seal, and which are ported so as to intermittently communicate the ports in the faces with each other through the ports 20 and 22 in the seal plate. In the described use of the face seal, the high pressure port 20 is constantly communicated with a high pressure bore or port formed in that face to which the face seal is keyed. Periodically, this high pressure fluid is released, via the face seal ports, to one or more bores or ports formed in the monoplanar face which moves relatively to the face seal and to the face to which it is keyed. The manner in which the face seal is keyed to the non-moving face is such that the O-ring seals 18, 40 and 46 bear against and sealingly engage the non-moving face during operation of the face seal. The opposite side 14 of the seal plate 10 faces toward, and extends parallel to, the moving face, and the monoplanar bearing surface 32 of the first sealing element 30 is in sealing and bearing contact with the moving face.

From this description of the relationship between the face seal and the two monoplanar faces between which it seals, it will be understood that two seal loading conditions exist at different times during each rotational cycle of the rotating face as a result of variation in the areas upon which fluid pressures act at these times. In one seal loading condition, bores or ports in the rotating face are aligned and communicate with the arcuate or banana shaped high and low pressure openings 20 and 22, respectively, in the seal plate 10. As the rotating face continues to rotate, the bores or ports formed in the rotating face move over and become aligned with the islands 24 and 26 of the seal plate, and are actually in direct alignment with, and blocked by, corresponding island portions of the first sealing element 30.

Assuming that the pressure of a high pressure fluid acting in and through the high pressure port 20 of the seal plate exerts a pressure $P_1$, and further assuming that the low pressure fluid entering and being delivered via the low pressure port 22 exerts a relatively low pressure $P_3$, fluid pressures may be shown to act on certain areas disposed on the face seal in the manner depicted in FIGS. 5–8. A detailed discussion of these pressures, the areas over which they act and the forces which act on opposite sides of the face seal as a result thereof are discussed in detail in U.S. Pat. No. 3,582,090. Understanding of the present invention will be facilitated, however, by briefly and generally describing the acting fluid pressures, and the areas upon which they act in a face seal of the type depicted in FIGS. 1–4, since the basic structure of that face seal is employed in the present invention, and the fluid pressures there acting also are generally encountered in the face seals of the present invention.

Figure 7:
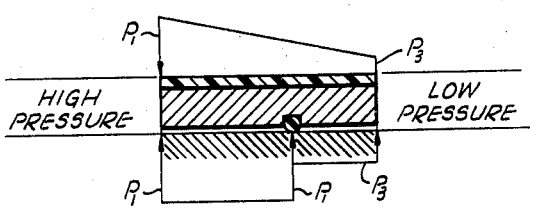
FIG. 7 is a diagram illustrating the manner in which fluid pressure act on a portion of a seal plate of the type described in U.S. Pat. No. 3,582,090 at a time when the ports located in the faces between which the seal structure is located are aligned with openings or ports through the seal plate.
Figure 8:
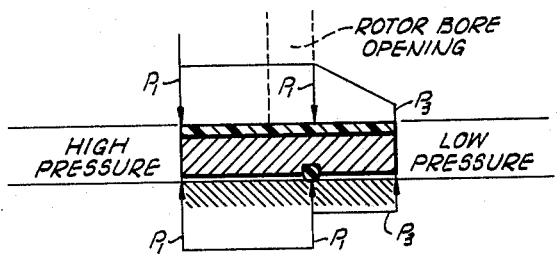
FIG. 8 is a diagram similar to FIG. 7, but illustrating the manner in which fluid pressures act on a portion of the seal plate when ports in the faces are aligned with islands between ports in the seal plate.

In FIG. 5 of the drawings, lines of the drawings, lines of constant pressure (isobars) acting upon the monoplanar sealing and bearing surface 32 of the first sealing element 30 are schematically illustrated. The pressure $P_1$ acts along an isobar which closely surrounds the high pressure port 20, and the pressure $P_3$ acts along an isobar which lies outwardly from the isobar $P_1$, and closely surrounds the low pressure port 22. At the outer peripheral edge of the monoplanar sealing and bearing surface 32, atmospheric or ambient pressure surrounding the face seal exists, and is represented by the isobar $P_2$. The illustrated isobars representing lines of substantially equal pressure acting on the monoplanar bearing and sealing surface 32 at a time when ports or bores in the moving face against which the face seal bears are aligned with, and receive high and low pressure fluids from, the high pressure and low pressure ports 20 and 22, respectively. It will be perceived in referring to FIG. 5 and the manner in which the isobars are disposed in the bearing and sealing surface 32 that a pressure gradient, decreasing in an outward direction from the high pressure port 20, acts against the bearing and sealing surface 32. Such gradient is schematically illustrated in FIG. 7 of the drawings.

At this same time, the high pressure fluid present at pressure $P_1$ in the high pressure port 20 exerts the full value of this pressure within the banana shaped O-ring seal 40, and thus exerts the pressure $P_1$ against the areas 42 and 44 on the opposite side of the seal plate 10 from the first sealing element 30. Outside the O-ring seal 40, the low pressure fluid acts at pressure $P_3$ against the seal plate area defined between the O-ring seal 18 and the O-ring seal 46.

It is shown in U.S. Pat. No. 3,582,090 that when the area surrounding the high pressure port 20 and lying between the $P_1$ and $P_3$ isobars is designated as area $A_1$; when the area between the $P_3$ and $P_2$ isobars is designed as area $A_2$; when the area within the O-ring seal 40 less the area of the high pressure port 20 is designated as area $A_3$; and finally, when that area outside the O-ring seal 40 and between the O-ring seals 18 and 46 is designated as area $A_4$, the total force exerted on the monoplanar bearing and sealing surface 32, and thus upon the side 14 of the seal plate which carries the first sealing element 30, is equal to $$F_t = \left(\frac{P_1 - P_3}{2}\right) A_1 + \left(\frac{P_3 - P_2}{2}\right) A_2 \quad (1)$$

and the total force which acts on the opposite side 12 of the seal plate 10 as a result of pressure exerted by the fluids is equal to $$F_T = P_1 A_3 + P_3 A_4 \quad (2)$$

It is further explained that in order to maintain sealing engagement between the monoplanar bearing and sealing surface and the rotating face, it is necessary that the force acting against the side 12 of the seal plate tending to move it toward the rotating face exceed the force acting against the side 14 of the seal plate tending to move it away from the rotating face. Thus, $F_T$ must exceed $F_t$. It is desirable, however, in order to minimize the power which is required to move the rotating face through its rotative movement in relation to the face seal that the net force acting across the seal plate to maintain it in sealing engagement with the moving face be minimized, or maintained at as low a magnitude as possible.

As previously pointed out herein, in the operation of face seals of the general type under discussion, different seal loading conditions exist at a time when the bores or ports in the rotating face pass out of alignment with the high pressure and low pressure ports 20 and 22, respectively, in the face seal and become aligned instead with the island portions 24 and 26 of the seal plate 10. At this time, as explained in detail in U.S. Pat. No. 3,582,090, fluid at high pressure $P_1$ acts against an area $A_5$ of the island portion 24 of the seal plate 10 (see FIG. 6) as one of the ports or bores in the moving face traverses this island in moving from the high pressure port 20 across the seal plate toward the low pressure port 22. Also at this time, the low pressure fluid exerts a pressure $P_3$ over an area $A_6$, as illustrated in FIG. 6 of the drawings, as one of the ports or bores in the moving face moves across the island 26 from the low pressure port 22 toward the high pressure port 20. These areas $A_5$ and $A_6$ are swept out across the bearing and sealing surface 32 formed on the first sealing element 30, and the forces developed as a result of the pressures $P_1$ and $P_3$ acting on the areas $A_5$ and $A_6$, respectively, are forces acting normal to the side 14 of the seal plate 10, and tending to move the face seal away from the rotating face adjacent the first sealing element 30. At this time of alignment of the bores or ports in the moving face with the island portions 24 and 26 of the seal plate 10, the force acting on the opposite side 12 of the face seal remains that described by Equation (2) since the high pressure fluid at pressure $P_1$ continues to act over the area $A_3$ within the O-ring seal 40, and the low pressure fluid continues to act at pressure $P_3$ over the area $A_4$ outside this O-ring seal. As explained in U.S. Pat. No. 3,582,090, the total force acting at this time on that side 14 of the face seal which carries the sealing element 30 is thus $$F_t = P_1 A_5 + P_3 A_6 + \frac{P_1 - P_3}{2}(A_1 - A_5 - A_6) + \left(\frac{P_3 - P_2}{2}\right) A_2 \quad (3)$$

and the total force acting normal to the seal plate 10 against the side 12 thereof at this time is still, as in the case of the first loading condition $$F_T = P_1 A_3 + P_3 A_4 \quad (2)$$

It can be perceived by referring to the relationships defined by Equations 1 and 3 that the force $F_t$ acting against the side 14 of the seal plate 10 at the time when the ports or bores in the moving face are aligned with the island portions 24 and 26 is greater than the force which acts on this same side of the seal plate at a different time when the bores or ports of the moving face are aligned with the high pressure and low pressure ports 20 and 22, respectively. It follows from this that it is necessary, at the former time, to oppose the force acting against the side 14 of the seal plate 10 with a force $F_T$ of higher magnitude then acting on the side 12 of the face seal in order to maintain sealing engagement between the sealing and bearing surface 32 and the moving face, than the force $F_T$ acting on the side 12 at the time when the bores or ports in the moving face are aligned with the high and low pressure ports 20 and 22 through the face seal.

To summarize, it is first necessary that at all times a net force act across the face seal in the direction of (toward) the moving face adjacent the face seal in order to maintain sealing contact between the bearing and sealing surface 32 and the moving face, and thereby prevent escape of fluid between the face seal and the moving face. The secondary consideration, but an important one, is to minimize this net force needed to maintain the sealing function, so that the drag imposed upon the moving or rotating face is not excessive, and the force necessary to turn the rotor or other structure carrying the moving face is minimized. The importance of this latter consideration in a device such as an energy exchange engine used for recovering fresh water from saline water is well understood in the art. It is also very important that the point-to-point loading of the face seal around its periphery at various times during its operation be as nearly balanced as possible to prevent distortion or bending of the seal. This is further discussed hereinafter.

As shown by the foregoing expressions, the time during rotation of the moving face when the greatest force is exerted generally against the face seal tending to open the seal, and to move the sealing and bearing surface away from the moving face, is that time when the bores or ports in the moving face are aligned with the island areas 24 and 26 of the seal, rather than communicating with the ports 20 and 22 therethrough. This being so, it is at this time that the largest counteracting force must act across the face seal in the opposite direction — that is, against the side 12 of the seal. To accomplish the described status, $F_T$ against side 12 must be greater than $F_t$ against side 14, and in order for the power required to drive the rotor or other member carrying the moving face in rotation to be minimized, it is necessary that the former force be only infinitesimally greater than the latter. Since $P_1$ and $P_3$ are substantially constant during operation of the device, it follows from the foregoing explanation that the described areas of the seal structure against which fluid pressure acts during operation of the seal plate between two relatively moving ported parallel faces are designed for the condition in which the ports or bores of the moving face pass periodically across the islands 24 and 26. In order to obtain the necessary small net force $F_n$ across the face seal toward the moving face at this time it is necessary that $$F_n = F_T(\text{acting on side } 12) - F_t(\text{acting on side } 14) > 0$$

$$= P_1 A_3 + P_3 A_4 - P_1 A_5 - P_3 A_6 - \frac{P_1 - P_3}{2}(A_1 - A_5 - A_6) -$$

$$\left(\frac{P_3 - P_2}{2}\right) A_2 > 0 \qquad (4)$$

where $P_3$ is very small in relation to $P_1$, Equation (4) may be simplified to $$F_n = P_1 A_3 - P_1 A_5 - \frac{P_1}{2}(A_1 - A_5 - A_6) \qquad (4a)$$

Thus, for $F_n$ to be the required infinitesimally small positive value, it is necessary in seals of the general character under description for the area $A_3$, which is the area within the high pressure O-ring seal 40, to be infinitesimally greater than the sum $$A_5 + \left(\frac{A_1 - A_5 - A_6}{2}\right) \qquad (5)$$

since the system pressure $P_1$ is a constant value.

The foregoing discussion demonstrates that the net force $F_n$ acting across the face seal toward the moving face in sealing contact therewith will fluctuate from a minimum value, when the moving face ports or bores are aligned with the islands 24 and 26, to a maximum value when such ports or bores are aligned with the high and low pressure ports 20 and 22, respectively, through the seal plate 10. With prior art seal plates of the type shown in FIGS. 1–3, it is explained that the buildup of the net force acting across the seal plate in the direction of or toward the moving face at the time when the ports or bores in the moving face are aligned with the ports 20 and 22 is undesirably large, but cannot be easily altered due to the necessity to fix the various areas included in the bearing and sealing surface 32 and within the banana shaped high pressure O-ring 40 so as to provide the necessary minimal net force at the time of bore-island alignment described.

It will also be noted when referring to FIG. 6 and the foregoing discussion that when the bores in the moving face traverse the islands 24 and 26 of the seal plate 10, a higher force $(P_1 A_5)$ acts on one side of the seal plate than the force $(P_3 A_6)$ acting on the other side (in a transverse sense). This disproportion of forces at the time of island traversal tends to warp or bend the seal plate and causes more wear across one island portion of the sealing element 30 than across the other. The face seal of this invention achieves better cross-seal (point-to-point) balance in a manner hereinafter described, and thus reduces the tendency of the seal to undergo distortion.

The present invention enables the net force acting at the time of alignment or registration between the ports 20 and 22 through the seal plate with the bores or ports through the moving face to be desirably reduced, thus facilitating reduction of the total power required to drive a rotor or other structure carrying the moving face in the desired rotational movement. In other words, the undesirable condition that the face seal is substantially more heavily loaded, or is forced against the moving face contacting the first sealing elements 30 by a relatively large net force at the time that the bores in the moving face are in alignment with the ports through the face seal, is alleviated to a significant degree by the present invention. Also the magnitude of the cross-seal difference in forces acting across the two islands of the sealing element 30 at the time of traversal of the islands by the bores (and tending to bend the seal plate) is reduced.

One embodiment of the present invention is illustrated in FIGS. 9–11B and includes a seal plate 50 carrying on one of the monoplanar sides 52 thereof (see FIG. 11), a sheet sealing element 54 which has a substantially monoplanar bearing and sealing surface 56 of the type hereinbefore described. The monoplanar bearing and sealing surface 56 surrounds an arcuate high pressure port or opening 58 and an arcuate low pressure port or opening 60 formed through the seal plate. The sheet sealing element 54 is retained in position on the monoplanar side of the seal plate by bonding, and by means of the rims or flanges 62 and 64. A circular recess 66 of area $A_7$ is formed in the sheet sealing element 54 on an island portion thereof 54a located between the high pressure port 58 and the low pressure port 60. The recess 66 is positioned so that its outer periphery is less than one rotating face bore diameter from the end boundary or edge of the high pressure port 58 in the sealing element 54. In other words, the diameter of a bore or port in the monoplanar face which moves relatively to the face seal is such that when this bore or port has completed its transit or crossing of the island 54a between the low pressure port 60 and the high pressure port 58, such port or bore will bridge between the high pressure port 58 and the recess 66, and will allow fluid communication to be established therebetween. This relationship is illustrated in FIG. 11a. Preferably, the recess 66 is also positioned within one bore diameter of the low pressure port 60 for a reason which will be hereinafter explained.

A small hole or fluid passageway 68 is formed through the seal plate 50 from the center of the recess 66 and opens on the opposite side 69 of the seal plate in an area $A_8$ defined within a small circular O-ring type fluid retaining sealing element 70 located on the island portion of the seal plate, and within a banana shaped high pressure O-ring fluid retaining sealing element 72. The high pressure O-ring sealing element 72 is located in a manner previously described in referring to FIGS.

1–6, and thus surrounds and encompasses the high pressure port 58 and parts of the islands of the seal plate adjacent the opposite ends of this port.

A second circular recess 74 defining an area $A_9$ is disposed substantially diametrically across the seal plate 50 from the circular recess 66, and is disposed in the other of the islands which is located between the high pressure port 58 and the low pressure port 60. The circular recess 74 is positioned so that its outer perimeter is spaced from the end boundary of the low pressure port 60 by a distance which is less than the diameter of the bores or ports of a moving face sealingly engaged by the face seal. Like the recess 66, the recess 74 is also preferably positioned within a similar distance (not more than the diameter of such moving face port or bore) of the high pressure port 58.

A small hole or fluid passageway 76 is formed through the seal plate 50 from the center of the recess 74 and opens on the opposite side of the seal plate within a second small circular O-ring fluid retaining sealing element 78 located on the island portion of the seal plate 50 and within the banana shaped high pressure O-ring sealing element 72. The O-ring fluid retaining sealing element 78 defines and encloses an area $A_{10}$. An O-ring seal 80 secured to the side 69 of the seal plate 50 surrounds a central opening 82 through the seal plate. Another O-ring seal 84 is secured around the outer periphery of the plate on the side 69, all in the manner hereinbefore described in referring to the embodiment of the invention shown in FIGS. 1–4.

OPERATION

As pointed out in the preceding discussion, the forces acting across a face seal of the general type here under discussion are substantially different at at time when the moving face bores and banana shaped seal plate ports are aligned, than at the time when the moving face bores are crossing, and in alignment with, the islands between the high and low pressure ports through the seal plate. The net force tending to force the seal plate toward the moving face is substantially greater at this latter time of bore-port alignment, and thus the maximum drag or resistance to the relative turning movement between the face seal and the moving face is then encountered. It is therefore at this time that the maximum power is required to rotate the rotor or move other rotating structure against the stationary face seal plate. In the case of the type of face seal illustrated in FIGS. 1–4 and described in U.S. Pat. No. 3,582,090, the net force acting at this time of bore-seal plate port alignment is seen from Equations (1) and (2) above to be $$F_n = F_T - F_t = P_1 A_3 + P_3 A_4 - \left(\frac{P_1 - P_3}{2}\right) A_1 - \left(\frac{P_3 - P_2}{2}\right) A_2 \quad (6)$$

where $P_1$, $P_2$, $P_3$, $A_1$, $A_2$ and $A_3$ and $A_4$ have the definitions hereinbefore set forth.

Figure 11B:
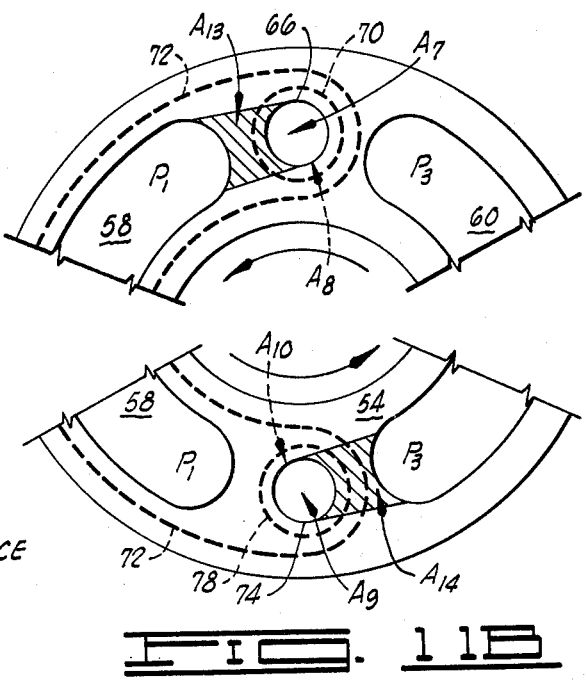
FIG. 11B is a diagram illustrating certain areas on the face seal shown in FIG. 11A where fluid pressures are exerted at the time of traversal of the island portions of the face seal by the rotor bores.
Figure 9:
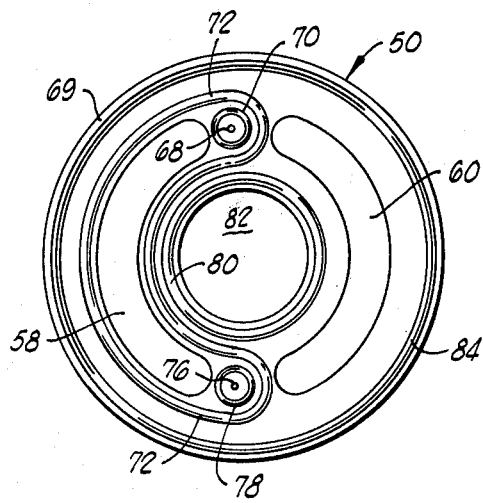
FIG. 9 is a view in elevation of one side of the face seal of the present invention and illustrating the shape and location of certain fluid confining sealing elements carried on one side of the seal plate.
Figure 10:
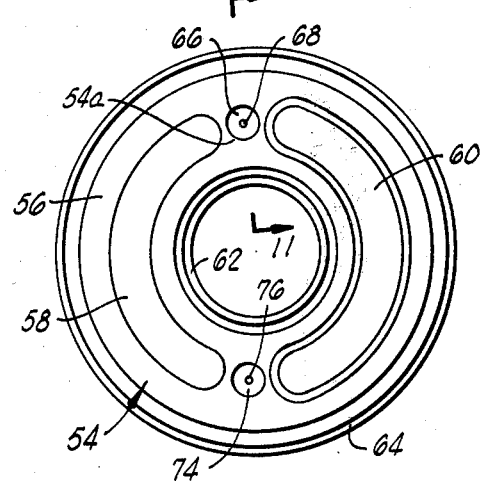
FIG. 10 is a view similar to FIG. 3, but illustrating the face seal of the present invention as one side of the seal plate appears when viewed in elevation, and depicting the location, in a monoplanar bearing and surface, of certain reliefs provided in accordance with the present invention.

At one time during the utilization of the improved face seal shown in FIGS. 9–11, two of the bores or ports in the moving face structure are bridging across these portions of the island which separate the recesses 66 and 74 from the adjacent high pressure port 58 and low pressure port 60, respectively. It will be perceived, considering FIGS. 11A and 11B, that when the moving face bore moves across the island from the low pressure port 60 to the high pressure port 58, there is a point in the rotational cycle when the high pressure fluid at pressure $P_1$ communicates via the bore with the recess 66 (and area $A_7$), with the hole 68 and with the area $A_8$ within the O-ring sealing element 70. At this time, the area $A_7$ within the recess 66 is subjected to pressure $P_1$, as is the area $A_8$ within the O-ring sealing element 70. There is also at this time, a force $P_1 A_{13}$ exerted against an area $A_{13}$ of the island between the recess 66 and the high pressure port 58, and directly under the bore of the moving face which is traversing this island (see FIG. 11B).

At the same time that the described relationship exists between a moving face bore, the recess 66 and the high pressure port 58, a second bore of the moving face is or may be in the described position relative to the recess 74 and the low pressure port 60. At this time, low pressure fluid at pressure $P_3$ communicates through the face seal bore or port with the recess 74, with the hole 76 and with the area $A_{10}$ within the O-ring 78, and at this time, the area $A_9$ within the recess 74 is at pressure $P_3$, as is the area $A_{10}$ within the O-ring 78. There is also at this time, a force $P_3 A_{14}$ exerted against an area $A_{14}$ of the island between the recess 74 and the low pressure port 60 and directly under the moving face bore traversing this island (see FIG. 11B).

The total force which acts against the entire side of the seal plate 50 carrying the sheet sealing element 54 at this time during the cycle of the moving face can be represented by the relationship $$F_t = \left(\frac{P_1 - P_3}{2}\right)(A_1 - A_7 - A_9 - A_{13} - A_{14}) + P_1 A_7 + P_3 A_9 + P_1 A_{13} + P_3 A_{14} + \left(\frac{P_3 - P_2}{2}\right) A_2 \quad (7)$$

where $F_t$ is such total force.

On the opposite side of the seal plate 50, the total force $F_T$ acting as a result of fluid pressure at the time in the rotational cycle described as shown by the relationship $$F_T = P_1(A_3 - A_8 - A_{10}) + P_1 A_8 + P_3 A_{10} + P_3 A_4 = P_1(A_3 - A_{10}) + P_3 A_{10} + P_3 A_4 \quad (8)$$

The net force tending to move the seal plate against a moving face sealing contacted by the face seal at this time, when the improved seal plate shown in FIG. 9–11 is employed, is therefore $$F_n = P_1(A_3 - A_{10}) + P_3 A_{10} + P_3 A_4 - \left(\frac{P_1 - P_3}{2}\right)(A_1 - A_7 - A_9 - A_{13} - A_{14}) - P_1 A_7 - P_3 A_9 - P_1 A_{13} - P_3 A_{14} - \left(\frac{P_3 - P_2}{2}\right) A_2 \quad (9)$$

The net force thus acting at this time to force the seal plate into sealing engagement with a moving ported or bored face, when compared with the net force acting upon a seal of the type shown in U.S. Pat. No. 3,582,090, can be seen from a comparison of Equations (4) and (9) to be substantially lower in the case of the seal plate of the present invention.

FIG. 11B illustrates schematically, certain areas and locations on the islands between ports where fluid pressure $P_1$ and $P_3$, as hereinbefore defined, are exerted at a time when the moving face or rotor bores are aligned with the high pressure and low pressure ports in the face seal. At this time, the moving face has moved in a direction with respect to the face seal, as illustrated in FIG. 11B, such that one bore in the moving face or rotor has crossed from the low pressure port to the high pressure port, and in doing so, has traversed the recess 66 which defines the area $A_7$ and has moved then into alignment with high pressure port 58. A second bore in the moving face has crossed the island from the higher pressure port 58 to the low pressure port 60 and in doing so, has traversed the recess 74 and the area $A_9$ which it defines.

After this has occured, an area $A_{13}$ between the recess 66 and the high pressure port 58 is under prssure approximately equal to $P_1$, and an area $A_{14}$ between the recess 74 and the low pressure port 60 is under a pressure approximately equal to $P_3$ (this is illustrated schematically in FIG. 11B). The areas $A_7$ and $A_9$ defined by the recesses 66 and 74, respectively, are, of course, under pressures $P_1$ and $P_3$, respectively, at this time following traversal of the moving face bores across the islands. During the period, then, when the moving face or rotor bores are aligned with the ports in the face seal, the force $F_t$, which acts against the side of the seal plate 50 which carries the sealing element 54, is (assuming $P_3$ is small in relation to $P_1$), $$F_t = \frac{P_1}{2}(A_1+A_7+A_{13}-A_9-A_{14}) + P_3(A_9+A_{14}) + \left(\frac{P_3-P_2}{2}\right) A_2 \quad (10)$$

and the force $F_T$ which acts to move the face seal toward the rotor or moving face is $$F_T = P_1(A_3-A_{10}) + P_3A_{10} - P_3A_4 \quad (11)$$

When Equation 10 above is compared with Equation 1, hereinbefore set forth, it is perceived that the effect of the inclusion of the recesses 66 and 74, and of the O-ring seals 70 and 78, on the face seal 50 in the locations described serves to result in an increased total force acting to move the seal away from the rotor at the time of bore-port alignment. The net force, $F_n$, acting across the face seal of FIGS. 9-11 at this time of maximum total loading is $$F_n = F_T-F_t + P_1(A_3-A_{10}) + P_3A_{10} + P_3A_4 - \frac{P_1}{2}(A_1+A_7+A_{13}-A_9-A_{14})$$
$$- P_3(A_9+A_{14}) - \left(\frac{P_3-P_2}{2}\right) A_2 \quad (12)$$

When the net force defined by Equation 12 is compared with the net force developed at this time (bore-port alignment) in the use of the old seals as expressed by Equation 6, it is perceived that there is a greater equalization of the differential force across the face seal (lower $F_n$) at this time as a result of the construction of the present invention, and that a better balancing of the seal occurs. Moreover, the total force $F_T$ acting on the opposite side of the face seal from that side in contact with the moving face or rotor becomes slightly lower, in the construction of the invention, than that which is attained in the prior art construction as represented by the total force which then acts as shown by Equation 2.

Another embodiment of the present invention is depicted in FIG. 12. This embodiment of the invention alleviates the sudden application of forces to the sealing element 88 carried on one side of the seal plate. These forces act at the corners or end portions of the high and low pressure ports 90 and 92, respectively, at those times when a bore or port in the rotating face moves into a position where communication is established with such ports, or just prior to such communication. At these times, there is established a pressure gradient or a high shear force acting between the port or bore in the moving face initially coming into communication with one of the ports 90 or 92 in the face seal, and that respective port and the port or bore constantly registering therewith in the non-moving face to which the face seal is keyed. These pressure gradients act across the lips or terminal portions of the sealing element 88 at the ends of the high pressure port 90 and the low pressure port 92 as the liquid passing through the face seal between the then communicated ports or bores in the two faces flows across these lips or edge portions. Just before such communication and fluid flow, a high shear force acts on the described lips or terminal portions, tending to chip or wear them away. In the case of a bore or port for the first time moving into registry with the high pressure port 90 after transiting an island 94 from the low pressure port 92, the pressure gradient acts from the high pressure fluid in the port 90 into the then registering bore or port in the moving face, and liquid flows at a relatively high rate across the lip or edge portion of the high pressure port 90 adjacent the island 94. The described pressure gradient, and the movement of the liquid in the direction described, wears or abrades the first sealing element 88 at this point, and more seriously, in some instances has been perceived to exert a sufficient force on this sealing element to destroy or seriously impair the bond between it and the seal plate at this location, with subsequent complete separation of the first sealing element from the seal plate.

As a port or bore in the moving face moves across a second island 96, and first establishes fluid communication with the low pressure port 92, high pressure fluid contained in the port or bore of the moving face rushes into the low pressure port of the seal plate across the edge or lip of the first sealing element 88 which defines the end boundary of the low pressure port nearest the island 96. Again, the pressure gradient, coupled with the wearing or abrasive character of the liquid or slurry moving across this lip or edge, abrades the material of the first sealing element 88 at this point and damages the face seal. Further, as pointed out above, even before communication is established, the high shear force developed across the thin lip or edge just before the bore achieves registration with the port can cause damage to the sealing surface at this point.

In order to alleviate the wearing and abrading of the sealing element 88 adjacent the ends of the high and low pressure ports 90 and 92, respectively, and to prevent the bond between the sealing element 88 and the seal plate from being impaired or destroyed, a small fluid conveying channel 98 is formed in the sealing element 88 across the island 94 between the high pressure port 90 and the low pressure port 92. Similarly, a second small fluid conveying channel 100 is formed in the sealing element 88 across the island 96 between the high pressure port 90 and the low pressure port 92. As the ported or bored moving face, against which the sealing element 88 bears, moves in rotation about a central axis so as to intermittently move its ports or bores into communication with the ports 90 and 92 in the seal plate, and alternately, into registration with the islands 94 and 96, each bore in the moving face will pass across, and be in fluid communication wtih, the fluid conveying channels 98 and 100 as the respective bore in the moving face crosses the islands which carry these channels.

As a result of this communication between the bore in the moving face and one of the fluid conveying channels, a slow bleed-off, or build-up, of pressure within the moving bore commences to occur, since the bore is communicated with the respective high pressure port 90 or the low pressure port 92 through the respective fluid conveying channels 98 and 100. For example, as a bore or port carried by the moving face commences to move across the island 94, fluid under pressure from the high pressure port 90 can act through the fluid conveying channel 98 to gradually increase the pressure in the bore which is commencing to move across the island 94. Prior to transiting the islands 94, this bore has contained low pressure fluid as a result of its communication with the low pressure port 92. By the time that the bore moving from the low pressure port 92 to the high pressure port 90 reaches the terminal edge of the high pressure port, the pressure within the moving bore has been built up or increased substantially, and is much closer to the pressure of the high pressure fluid in the high pressure port. There is thus no momentary development of a high shear force and no abrupt or sudden change in pressures with an accompanying pressure gradient which causes the high pressure fluid to suddenly rush across the lip of the sealing element 88 at this point, and wear or abrade this element severely, or tend to destroy the bond between the sealing element and the seal plate.

The same gradual near equalization of the pressure occurs in the case of a bore carried by the moving face and moving from the high pressure port 90 to the low pressure port 92 across the island 96. Here, the bore commencing to transit the island 96 has been filled with a high pressure fluid at the time of its communication with the high pressure port 90. As this bore passes out of alignment with the high pressure port and into registry with the island 96, the high pressure fluid begins to bleed via the small fluid flow channel 100 into the low pressure port 92 and there is a gradual reduction in the pressure of the fluid carried in the bore of the moving face. There is therefore a consequent reduction in the pressure gradient which acts across the edge of the sealing element 88 at the instant that the bore in the moving face first moves over the edge of the low pressure port 92, and wear and abrasion are accordingly reduced. Moreover, the deleterious preliminary development of the described high shear force is also obviated.

The embodiment of the invention illustrated in FIG. 13 of the drawings combines the structural aspects of the embodiments shown in FIGS. 9–11a and in FIG. 12. Thus, the face seal shown in FIG. 13, like the face seals previously discussed, includes a sealing element 102 carrying a monoplanar bearing and sealing surface of the type hereinbefore discussed, and secured by bonding or other suitable means to one side of a seal plate. The seal plate and the sealing element have formed therethrough a high pressure port 104 and a low pressure port 106. Island portions 108 and 110 separate the high and low pressure ports. As in the case of the embodiment of the invention shown in FIGS. 9–11a, the sealing element 102 is relieved at locations intermediate the high and low pressure ports 104 and 106, respectively, and on the island portions 108 and 110, to provide a pair of circularly shaped recesses 112 and 114. These recesses are located on the islands 108 and 110, respectively, and are oriented in their positions in relation to the high and low pressure ports 104 and 106 in the manner which has been previously described in referring to the recesses 66 and 76 illustrated in FIG. 10 of the drawings.

The face seal shown in FIG. 13 also is characterized in having small holes or apertures 116 and 118 which extend through the sealing element 102 and the face seal upon which it is mounted from the center of the recesses 112 and 114, respectively, into the center of an area enclosed within a small circular fluid retaining O-rings of the type previously described and shown in FIG. 9 of the drawings where such O-rings are designated by reference numerals 70 and 78. The small circular O-rings, though not shown in FIG. 13, are located on the opposite side of the seal plate from the sealing element 102, and are oriented and positioned with respect to a high pressure, banana shaped O-ring sealing element which surrounds the high pressure port 104 in the same manner as the small circular O-rings 70 and 78 shown in FIG. 9 are related to the banana shaped high pressure O-ring sealing element 72 there illustrated. Extending between the high pressure port 104 and the low pressure port 106 at opposite ends thereof, and intersecting the circular recesses 112 and 114 are a pair of elongated, relatively small fluid passageways 120 and 122. These small fluid passageways constitute further or additional reliefs in the monoplanar bearing and sealing surface of the sealing element 102 at the location where this element overlies the island portions of the face seal.

The functions which have been attributed to the circular recesses formed in the island portions of the sealing element carried by the seal plate continue to be performed by the recesses 112 and 114 shown in FIG. 13, in conjunction with the associated small O-ring seals disposed on the opposite side of the seal plate in the manner shown in FIG. 9. There is thus realized, as a result of the inclusion of this structure in the face seal, a reduction in the magnitude of the net force acting across the face seal in a direction to bias it into engagement with a moving face against which it seals. Concurrently, the provision of the small fluid conveying channels 120 and 122 enables the pressure of fluids carried in the ports or bores of the moving face as these cross islands 108 and 110 to be gradually equalized to the pressure which obtains in that one of the ports 104 or 106 with which such bore will next communicate. The abrading and wearing effect of a sudden increase or decrease in the pressure carried in such bore, with the concomitant fluid movement across the edge portions of the sealing element 102 adjacent the ports 104 and 106, is obviated. The size of the channels 120 and 122 should be the minimum size needed to avoid the described wear and abrasion, since such minimization will also minimize the leakage between the high and low pressure ports.

FIGS. 14 and 15 illustrate two different embodiments of the invention which function generally similarly to the embodiment of the invention shown in FIG. 12 to pre-relieve the pressure gradient developed at the initial instant of bore-port alignment, and to minimize the shear loading on the seal surface just before such alignment. Instead of small fluid conveying channels extending between the high and low pressure ports, as typified by the channels 98 and 100 shown in FIG. 12 of the drawings, the embodiment illustrated in FIG. 14 has small reliefs 123 and 124 projecting from the leading ends of the high and low pressure ports 125 and 126, respectively, and tapering to pointed ends disposed well inwardly on the islands between the ports. This form of relief of the bearing and sealing surface also permits a gradual equalization of the pressure prevalent in a bore or port in the moving face, as such bore or port crosses one of the islands, with the pressure in the respective port 125 or 126 approached by the moving face bore or port. The sudden development of high shear loading, followed by the development of a substantial pressure gradient acting at a time when a bore carrying relatively low pressure fluid first registers with the high pressure port 125, can also be obviated or reduced by merely providing a small hole or aperture 127 from a point located within the banana shaped high pressure fluid retaining O-ring sealing element 128 located on one side of the seal plate as shown in dashed lines in FIG. 15, and the monoplanar bearing and sealing surface of the sealing element carried on one side of the seal plate. This structure, illustrated in FIG. 15, also allows the pressure of the fluid in the bore crossing the island to be increased as the bore communicates with high pressure fluid contained within the high pressure O-ring sealing element 128 when the bore moves over the opening or aperture 127.

Yet another embodiment of the invention is illustrated in FIG. 16 of the drawings. As in the prior figures of the drawings herein discussed, FIG. 16 depicts one side of a seal plate which carries thereon a sealing element 132 having a monoplanar bearing and sealing surface ported by a high pressure port 134 and a low pressure port 136. The ports are separated by islands 138 and 140. In the embodiment of the invention here illustrated, the monoplanar bearing and sealing surface of the sealing element 132 is relieved at locations immediately adjacent the opposite ends of the high pressure port 134. Two alternative forms of relief are shown, one being the finger shaped channels 141 and 142 formed at one end of the high pressure port 134 and extending into the island portion 138. At the other end of the high pressure port 134, a panduriform recess 144 is provided in the island portion 140. Either of the forms of relief described may be employed at either or both locations, or other forms may be utilized, the primary consideration being that that portion of the monoplanar bearing and sealing surface of the sealing element 132 which lies immediately adjacent the opposite ends of the high pressure port 134 be relieved from the plane of the monoplanar bearing and sealing surface over a significant area.

In the embodiment of the invention illustrated in FIG. 16, the full or entire pressure $P_1$ of the high pressure fluid which continues to flow into and exist in the high pressure port 134 is exerted at all times during operation of the face seal against the areas of the recesses 141, 142 and 144. Assuming for the purposes of discussion that these areas are summed and the total area of the several recesses is referred to as area $A_{15}$, the force developed as a result of the exertion of the total fluid pressure $P_1$ of the high pressure fluid against these areas is therefore $P_1 \times A_{15}$. Thus, at the time that a port or bore in the rotating face sealingly contacted by the sealing element 132 is aligned with the high pressure port 134 through the seal plate, the force exerted against the side of the seal plate carrying the element 132 is that shown by the expression $$F_t = P_1 A_{15} + \left(\frac{P_1-P_3}{2}\right)(A_1-A_{15}) + \left(\frac{P_3-P_2}{2}\right) A_2 \quad (13)$$

Comparison of Equation (12) with Equation (1) hereinbefore set forth indicates that provision of the reliefs 141, 142 and 144 allows a greater force to be exerted against that side of the face seal which carries the sealing element 132 at the time of bore-port alignment when the embodiment shown in FIG. 16 is utilized, than at the same time during the use of the prior art face seal shown in FIGS. 1,6. Thus, as will be clear from the foregoing discussion, the net force acting to bias the force seal against the rotating or moving face at this time of boreport alignment is reduced and the power required to move the body which carries the moving face is also reduced.

Figure 17:
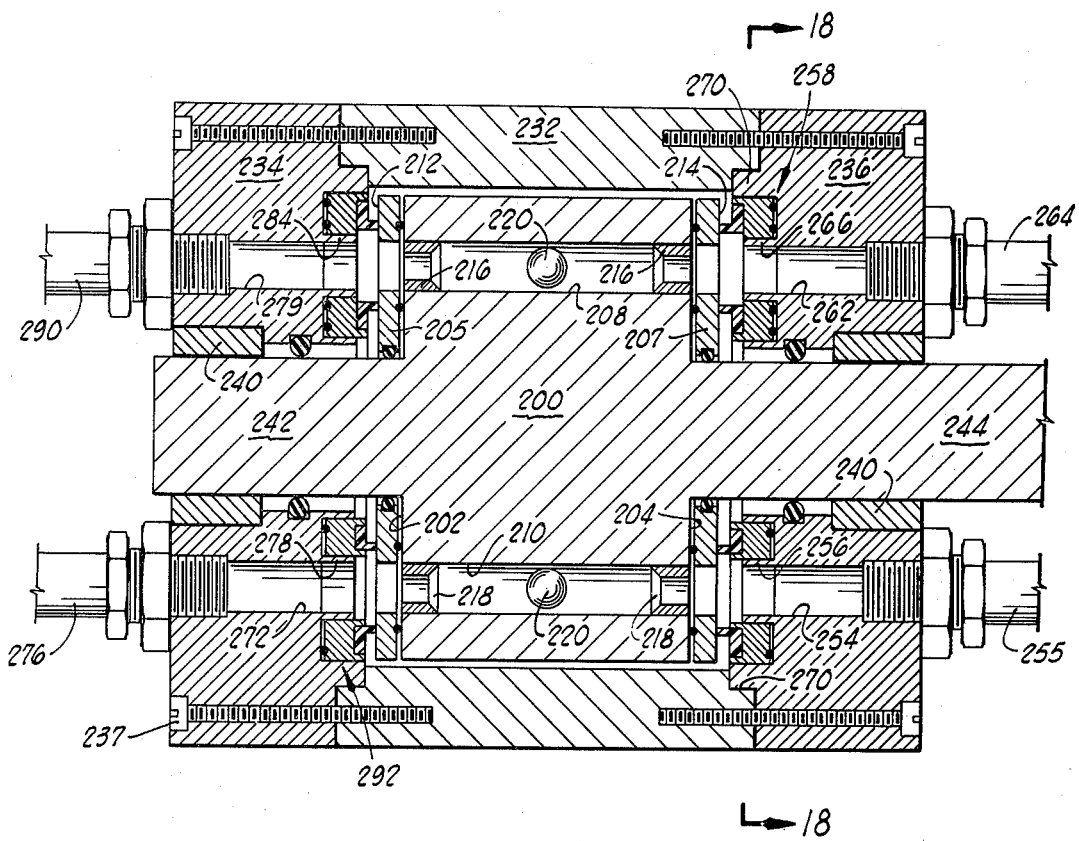
FIG. 17 is a sectional view taken along the longitudinal center line and rotational axis of an energy exchange engine having the face seals of the present invention incorporated therein.
Figure 18:
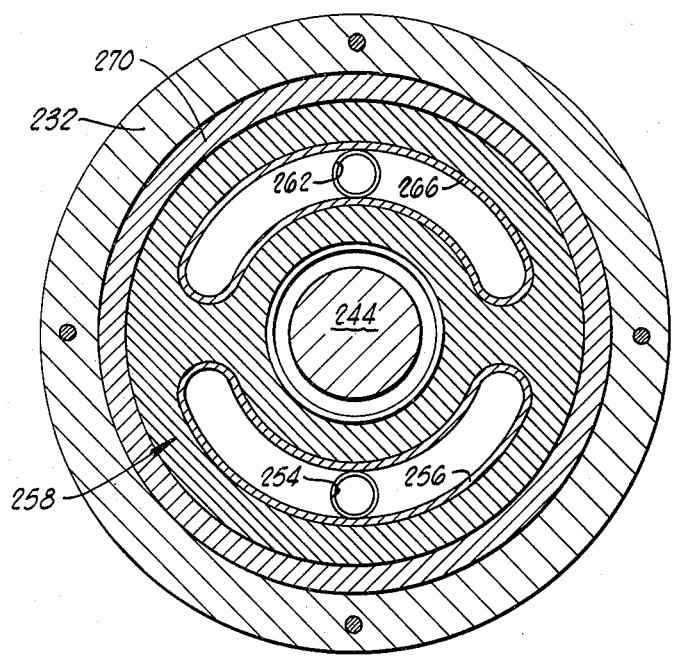
FIG. 18 is a sectional view taken along line 18—18 of FIG. 17.

A preferred application of the face seal structure of the invention is illustrated in FIGS. 17 and 18. FIG. 17 is a sectional view taken through the center, and along the longitudinal axis, of an energy exchange engine used for exchanging pressure energy between a relatively low pressure fluid and a relatively high pressure fluid. The engine includes a solid cylindrical rotor 200 which has a pair of spaced, planar end faces 202 and 204. There may be secured to the end faces 202 and 204, a pair of wear plates 205 and 207 which have substantially planar end faces which extend substantially parallel to each other. Extending through the rotor 200 in an axial direction, and through the wear plates 205 and 207 are a plurality of spaced, substantially parallel bores 208 and 210. The bores 208 and 210 are of generally circular cross-section, and two of the axially extending bores are shown in the energy exchange engine depicted in FIGS. 17 and 18. The bores 208 and 210 each open at their opposite ends in the end faces 212 and 214 of the wear plates 205 and 207, respectively. Ball stops 216 are positioned in the opposite ends of the bore 208 and ball stops 218 are positioned at the opposite ends of the bore 210. A small spherical member or ball 220 is rollably mounted in each axial bore.

Surrounding the cylindrical rotor 200 is a housing 232. The housing is generally cylindrical, and has opposite ends which are closed by a pair of closure plates 234 and 236 by means of axially extending bolts 237. The closure plates 234 and 236 are provided with central openings in which are mounted annular bearings 240 for journaling a central stub shaft 242 projecting from one end face of the rotor 200 through a central aperture in the wear plate 205, and a drive shaft 244 which projects through the wear plate 207 and the central opening in the other closure plate. A suitable power source (not shown) is used to drive thr rotor in rotation by coupling the power source to the drive shaft 244.

A low pressure fluid inlet passageway 254 extends through the closure plate 236 and receives low pressure fluid from a suitable conduit 255. The passageway 254 opens into the area within an arcuate retainer flange 256 of generally kidney- or banana-shaped configurarion, as shown in FIG. 18. The retainer flange 256 functions to key a face seal 258 constructed in accordance with the present invention to the closure plate 236. It will be noted that the low pressure fluid passageway 254 is positioned in axial alignment with the axially extending bore 210 in the rotor 200 and wear plate 207 when the rotor is in the position illustrated in FIG. 17.

A high pressure fluid discharge passageway 262 is provided through the closure plate 236 and is positioned for alignment with the bore 208 in the rotor 200 and the wear plate 207 when the rotor is in the position illustrated in FIG. 17. The passageway 262 communicates with a high pressure fluid discharge conduit 264 secured to the closure plate 236, and also communicates with the area circumscribed by an arcuate (banana- or kidney-shaped) retainer flange 266 similar in configuration to the retainer flange 256 hereinbefore described. The closure plate 236 further includes an annular, outer face seal retaining flange 270 which projects from the face of the closure plate 236 in the axial direction with relation to the rotor 200, and cooperates with the retainer flange 256 in keying the face seal 258 to the closure plate 236.

The closure plate 234 is constructucted substantially identically to the closure plate 236 and has a low pressure fluid discharge passageway 272 extending therethrough to establish communication between a low pressure fluid discharge conduit 276, and an arcuate face seal retainer flange 278, similar to the flanges 256 and 266 hereinbefore described. A high pressure inlet passageway 279 is formed through the closure plate 234 on the opposite side thereof from the low pressure fluid discharge passageway 272 to establish communication between an arcuate, banana-shaped retainer flange 284 and a high pressure fluid inlet conduit 290. The retainer flanges 278 and 284 are employed to key a face seal 292 to the closure plate 234.

Face seals 258 and 292 constructed in accordance with the present invention are positioned between the respective closure plates 234 and 236 and the wear plates 205 and 207 which are keyed by any suitable means to the end faces of the rotor. In this arrangement, the planar end faces of the wear plates 205 and 207, against which the two face seals of the present invention bear, rotate relative to the face seals. The face seals 258 and 292 are keyed to the stationary closure plates 234 and 236. Thus, in the manner which has been described previously, as the rotor 200 is rotated, the passageways 254, 262, 272 and 279 are periodically placed in communication with the bores 208 and 210 in the rotor 200 through high and low pressure ports formed in the face seals as illustrated in FIG. 17. The fluid pressures exerted by the high and low pressure fluids thus periodically passed through the ports in the face seals exert the pressures on the areas previously described in effect balancing of each face seal, and minimization of the power required to rotate the rotor. The details of operation of an energy exchange engine of the type described for the purpose of transferring pressure energy from a relatively high pressure fluid to a relatively low pressure fluid is explained in detail in U.S. Pat. No. 3,582,090, assigned to the assignee of the present application.

From the foregoing description of the invention, it will be perceived that the present invention provides an improved face seal which, by its construction, reduces the total power required to move one of the faces sealed by the face seal in relation to the other face during sealing engagement of both faces by the interpositioned face seal. Further, the improved face seal is characterized in having a longer and more effective operating life by reducing abrading and wearing forces developed by liquid flowing against lip zones adjacent the fluid transmissive ports formed in the face seal.

Although certain preferred embodiments of the invention have been herein described in order to illustrate the basic principles underlying the invention, it will be understood that other geometric forms of relief which are not positioned precisely in the locations of those shown in the herein illustrated embodiments may be provided in such face seals to take advantage of the elucidated principles. Modifications of this type are therefore deemed to be circumscribed by the spirit and scope of the invention except as the same may be necessarily limited by the appended claims or reasonable equivalents thereof.

What is claimed is:

1. A face seal for sealing between two relatively moving planar faces comprising:
a seal plate having a pair of opposed, parallel, substantially monoplanar sides, and having a plurality of spaced openings therethrough disposed a common radial distance outwardly from a central axis projected perpendicularly to the planes of said sides through the center of said seal plate, said seal plate further having islands positioned between adjacent openings therethrough;
a monoplanar bearing and sealing surface carried on one of said sides of said seal plate and extending parallel to said sides, said bearing and sealing surface surrounding the openings through said seal plate and overlying the islands of said seal plate, that portion of the bearing and sealing surface which overlies said islands being relieved at at least one location over at least one of said islands; and
at least one fluid retaining sealing element secured to the monoplanar side of said seal plate opposite the side thereof carrying said sealing surface, each of said fluid retaining sealing elements extending around, and encompassing, an area on said opposite side, a portion of which area is the area of one of said openings, and other portions of said area being parts of said islands disposed adjacent the opposite ends of said one opening, said fluid retaining sealing elements and openings being located so that at least one opening not surrounded by, and encompassed within, one of said fluid retaining sealing elements is positioned adjacent, and spaced by one of said islands from, each of said openings which is surrounded by, and encompassed within, one of said fluid retaining sealing elements.

2. A face seal as defined in claim 1 and further characterized as including an additional fluid retaining sealing element secured to said opposite side of said seal plate on one of said island parts surrounded by one of said first mentioned fluid retaining sealing elements, said additional fluid retaining sealing element extending around and encompassing an area on said one island part, and wherein one of said releifs in said sealing surface includes a fluid passageway extending through said plate therefrom and opening in the area surrounded by, and encompassed within, said additional fluid retaining sealing element.

3. A face seal as defined in claim 1 wherein the relief in said monoplanar bearing and sealing surface includes a fluid conveyance channel in said surface extending from one of said openings at least a part of the way across the portion of said surface overlying said islands toward a second of said openings.

4. A face seal as defined in claim 1 wherein one of said reliefs in said bearing and sealing surface is a fluid passageway extending through said plate therefrom and opening in one of said parts of said islands which is surrounded and encompassed by one of said first mentioned fluid retaining sealing elements.

5. A face seal as defined in claim 1 wherein said fluid retaining sealing elements are elastomeric O-ring seals.

6. A face seal as defined in claim 1 and further characterized as including a sheet sealing element bonded to said seal plate and having said monoplanar bearing and sealing surface formed thereon.

7. A face seal as defined in claim 1 and further characterized as including another fluid retaining sealing element on said opposite side of said seal plate extending around said seal plate outside of, and encompassing all of said first mentioned fluid retaining sealing elements, and an additional fluid retaining sealing element of generally annular configuration positioned inside said first mentioned sealing element and around said central axis with said first mentioned sealing elements being disposed outside of said additional fluid retaining sealing elements.

8. A face seal as defined in claim 1 wherein there are two openings through said seal plate and said plate has two of said islands.

9. A face seal as defined in claim 8 wherein said openings are each arcuate banana shaped ports each lying, with said islands, on a common circle in said seal plate which is concentric with respect to said central axis, and wherein one of the first mentioned fluid retaining sealing elements extends along the opposite side edges of one of said ports and beyond the opposite ends thereof to encompass a part of each of the islands adjacent the opposite ends of said one port.

10. A face seal as defined in claim 9 wherein there are two reliefs in said monoplanar bearing and sealing surface disposed adjacent the ends of said one port in line, through said seal plate, with said encompassed parts of said islands, said reliefs each including a recess in said bearing and sealing surface and a fluid passageway extending through the seal plate and opening in one of said encompassed parts of said islands;

and wherein said face seal is further characterized in including additional fluid retaining sealing elements positioned around the opening of each of the fluid passageways in the respective encompassed island part and each extending around an area of the seal plate within the respective encompassed island part.

11. A face seal as defined in claim 10 wherein said monoplanar bearing surface, first mentioned fluid retaining sealing element, additional fluid retaining sealing element and recess are configured and define areas upon which fluid pressure acts on the opposite sides of the seal plate, when in use, to yield a minimal net positive force due to fluid pressure acting normal to and against the side of said plate carrying said fluid retaining sealing elements.

12. In combination with two relatively moving solid bodies having substantially parallel, planar faces, each having at least two spaced ports therein with each of said ports disposed substantially the same radial distance from an axis estending normal to both said faces at a central point therein, a ported face seal positioned between the faces in sealing engagement therewith, said face seal comprising:

a disc-shaped seal plate having two opposed, substantially parallel sides extending parallel to said planar faces;

a monoplanar bearing and sealing surface carried on one side of said seal plate, said sealing surface and seal plate having at least two spaced ports therethrough, said monoplanar bearing and sealing surface sealingly engaging the planar face of one of said bodies;

means keying said seal plate to the other of said solid bodies for preventing relative rotation between said other body and seal plate about said axis and for aligning the ports through said seal plate with a corresponding number of ports in said other solid body, said keying means facilitating movement of said seal plate toward and away from the planar face of said one body;

an elastomeric sealing element secured to the opposite side of said seal plate from said monoplanar bearing and sealing surface and encircling an area of said opposite side of the seal plate to confine fluid within said area, said elastomeric sealing extending around one of the ports through said seal plate and aligned port in said other body to which said seal plate is keyed, said encircled area including portions of said opposite side of said seal plate located adjacent the port through said seal plate around which said first elastomeric sealing element extends, and further located in the space between ports through said sealing element and at a substantially equivalent radial distance from said axis as the radial distance by which said ports are spaced from said axis;

sealing means secured to said opposite side of said seal plate and defining a sealing boundary surrounding each of said ports not surrounded by said elastomeric sealing element;

means connected to said other body for conveying a fluid to the port in said other body around which the said first elastomeric sealing element extends;

means connected to said other body for conveying a fluid to a different one of said ports the port to which said first mentioned fluid conveying means is connected, said monoplanar bearing and sealing surface being relieved at a location between at least two of said spaced ports and in a position to afford registration of the relief therein with the ports in said one body during relative movement between said bodies, and to establish fluid communication via said relief at the time of said registration, between fluid in a port in said one body in registration therewitih and fluid in at least one of the ports through said seal plate.

13. The combination defined in claim 12 and further characterized in including an additional elastomeric sealing element of annular configuration secured to said opposite side of said seal plate upon one of said portions adjacent the port around which said first elastomeric sealing element extends and positioned within said first elastomeric sealing element; and a passageway extending through said seal plate and placing the area inside said additional elastomeric sealing element in communication with said relief.

14. The combination defined in claim 12 wherein the relief in said monoplanar bearing and sealing surface includes a fluid conveying channel in said surface extending from one of said ports at least a part of the way across the portion of said surface extending between said one port and the next adjacent port.

15. The combination defined in claim 12 and further characterized as including:
a source of relatively high pressure fluid;
a conduit connecting said source of high pressure fluid to one of the ports in one of said faces;

a source of relatively low pressure fluid; and
means connecting said source of low pressure fluid to one of the ports in the other of said faces.

* * * * *

UNITED STATES PATENT OFFICE
CERTIFICATE OF CORRECTION

Patent No. 3,910,587            Dated   October 7, 1975

Inventor(s) Robert I. Loeffler and Lonnie C. Higginbottom

It is certified that error appears in the above-identified patent and that said Letters Patent are hereby corrected as shown below:

Column 2, line 52, change "occuur" to --occur--.

Column 3, line 4, after "at" and before "time" insert --this--.

Column 5, line 47, change "pressure" to --pressures--.

Column 5, line 63, after "and" and before "surface" insert --sealing--.

Column 6, line 48, change "advantage" to --advantages--.

Column 8, line 43, change "transmissions" to --transmission--.

Column 10, line 44, delete "lines of the drawings".

Column 14, line 20, change "elements" to --element--.

Column 14, line 68, change "a" to --the--.

Column 17, line 6, change "higher" to --high--.

Column 20, line 44, change "pressure" to --pressures--.

Column 20, line 45, after "cross" insert --the--.

Column 22, line 10, change "1,6" to --1-6--.

Column 22, line 13, change "boreport" to --bore-port--.

UNITED STATES PATENT OFFICE
CERTIFICATE OF CORRECTION

Patent No. 3,910,587         Dated October 7, 1975

Page 2 of 2

Inventor(s) Robert I. Loeffler and Lonnie C. Higginbottom

It is certified that error appears in the above-identified patent and that said Letters Patent are hereby corrected as shown below:

-- 2 --

Column 23, line 11, change the last "the" in that line to --an--.

Column 24, line 56, change "releifs" to --reliefs--.

Column 25, line 64, change "estending" to --extending--.

Column 26, line 21, after "sealing" and before "extending" insert the word --element--.

Column 26, line 40, after "-ports" insert -- the --.

*Signed and Sealed this*

*tenth* Day of *February 1976*

[SEAL]

Attest:

RUTH C. MASON  
*Attesting Officer*

C. MARSHALL DANN  
*Commissioner of Patents and Trademarks*